US011656176B2

(12) United States Patent
Wang et al.

(10) Patent No.: US 11,656,176 B2
(45) Date of Patent: May 23, 2023

(54) **NEAR-INFRARED SPECTROSCOPY-BASED METHOD FOR CHEMICAL PATTERN RECOGNITION OF AUTHENTICITY OF TRADITIONAL CHINESE MEDICINE *GLEDITSIAE SPINA***

(71) Applicant: SHENZHEN INSTITUTE FOR DRUG CONTROL (SHENZHEN TESTING CENTER OF MEDICAL DEVICES), Guangdong (CN)

(72) Inventors: Tiejie Wang, Shenzhen Guangdong (CN); Lijun Wang, Guangdong (CN); Yan Yan, Guangdong (CN); Jue Wang, Guangdong (CN); Guo Yin, Guangdong (CN); Kun Jiang, Guangdong (CN); Jing Li, Guangdong (CN); Yang Wang, Guangdong (CN); Yin Hui, Guangdong (CN)

(73) Assignee: SHENZHEN INSTITUTE FOR DRUG CONTROL (SHENZHEN TESTING CENTER OF MEDICAL DEVICES)

( * ) Notice: Subject to any disclaimer, the term of this patent is extended or adjusted under 35 U.S.C. 154(b) by 381 days.

(21) Appl. No.: 17/043,325

(22) PCT Filed: Apr. 1, 2019

(86) PCT No.: PCT/CN2019/080873
§ 371 (c)(1),
(2) Date: Sep. 29, 2020

(87) PCT Pub. No.: WO2019/192433
PCT Pub. Date: Oct. 10, 2019

(65) Prior Publication Data
US 2021/0025815 A1 Jan. 28, 2021

(30) Foreign Application Priority Data

Apr. 3, 2018 (CN) .......................... 201810290323.7

(51) Int. Cl.
*G01N 21/359* (2014.01)
*G06F 18/23* (2023.01)
(Continued)

(52) U.S. Cl.
CPC ....... *G01N 21/359* (2013.01); *G06F 18/2115* (2023.01); *G06F 18/2132* (2023.01);
(Continued)

(58) Field of Classification Search
CPC ............ G01N 21/359; G01N 21/3504; G01N 21/3563; G01N 21/3577;
(Continued)

(56) References Cited

U.S. PATENT DOCUMENTS 4,893,253 A 1/1990 Lodder

FOREIGN PATENT DOCUMENTS

CN 103776797 A 5/2014
CN 103837492 A 6/2014
(Continued)

OTHER PUBLICATIONS

International Search Report dated Jul. 3, 2019 for PCT/CN2019/08073.
(Continued)

*Primary Examiner* — Christine S. Kim
(74) *Attorney, Agent, or Firm* — Kathleen D. Rigaut; Howson & Howson LLP

(57) ABSTRACT

Provided is a near-infrared spectroscopy-based method for chemical pattern recognition of the authenticity of the traditional Chinese medicine Gleditsiae Spina. The method uses the combination of a near-infrared spectroscopy acqui-
(Continued)

sition method, a 1st derivative pretreatment method and a successive projection algorithm, a Kennard-Stone algorithm and a marching algorithm to perform chemical pattern recognition on the authenticity of the Gleditsiae Spina. The results of the pattern recognition method are accurate and reliable, and Gleditsiae Spina and counterfeits thereof can be accurately distinguished. The present application is the first to establish a method for the chemical pattern recognition of the quality of Gleditsiae Spina based on near-infrared spectroscopy, and can accurately distinguish between Gleditsiae Spina and counterfeits thereof, and provides scientific basis for the quality evaluation of Gleditsiae Spina.

10 Claims, 4 Drawing Sheets

(51) Int. Cl.
*G06F 18/2115* (2023.01)
*G06F 18/2132* (2023.01)
*G01N 21/3504* (2014.01)
*G01N 21/3563* (2014.01)
*G01N 21/3577* (2014.01)

(52) U.S. Cl.
CPC ......... *G06F 18/23* (2023.01); *G01N 21/3504* (2013.01); *G01N 21/3563* (2013.01); *G01N 21/3577* (2013.01); *G01N 2201/1296* (2013.01)

(58) Field of Classification Search
CPC ......... G01N 2201/1296; G06K 9/6218; G06K 9/6231; G06K 9/6234; G06K 9/6256; G06K 9/6267
See application file for complete search history.

(56) References Cited

FOREIGN PATENT DOCUMENTS

| CN | 107121406 A |   | 9/2017  |            |
|----|-------------|---|---------|------------|
| CN | 108509997 A |   | 9/2018  |            |
| CN | 109444066 A | * | 3/2019  | G01N 21/35 |
| CN | 110514611 A | * | 11/2019 | G01N 21/33 |
| CN | 113762208 A | * | 12/2021 |            |

OTHER PUBLICATIONS

First Office Action, dated Jun. 6, 2021, issued in corresponding Chinese Patent Application No. 201810290323.7.

* cited by examiner

NEAR-INFRARED SPECTROSCOPY-BASED METHOD FOR CHEMICAL PATTERN RECOGNITION OF AUTHENTICITY OF TRADITIONAL CHINESE MEDICINE GLEDITSIAE SPINA

CROSS-REFERENCES TO RELATED APPLICATIONS

This is a National Stage Application, filed under 35 U.S.C. 371, of International Patent Application No. PCT/CN2019/080873, filed on Apr. 1, 2019, which is claims the benefit of Chinese patent application No. 201810290323.7 filed on Apr. 3, 2018, the disclosure of each being incorporated herein by reference.

TECHNICAL FIELD

The present application belongs to the field of chemical analysis, and relates to a near-infrared spectroscopy-based method for chemical pattern recognition of authenticity of a traditional Chinese medicine, Gleditsiae Spina.

BACKGROUND

Gleditsiae Spina is the dry spine of *Gleditsia sinensis* Lam. and has effects of dispersing swelling, expelling toxins, expelling pus and killing worms (Pharmacopoeia of the People's Republic of China (2015 Edition) Volume I. 2015: 177-178). Modern pharmacological tests show that flavonoids such as fustin and quercetin in the Gleditsiae Spina have good anti-tumor effects (XU Zhe, ZHAO Xiaodi, WANG Yimeng et al., Identification and anti-tumor activity determination about anti-tumor components of *Gleditsia sinensis* Lam. Stings Journal of Shenyang Pharmaceutical University. 2008, (2): 108-111). With increasing market demands, the Gleditsiae Spina has been found adulterated with other plant spines, such as spines of *Gleditsia japonica* Miq., *Gleditsia microphylla* Gordon ex Y. T. Lee, *Rubus cochinchinensis* Tratt., etc. These counterfeits are very similar in appearance to the Gleditsiae Spina and are more difficult to be visually recognized after they are made into decoction pieces or medical powder. At present, traditional characteristic identification and microscopic identification methods do not involve effective substance composition. Physical and chemical identification methods merely evaluate individual ingredients, which is difficult to reflect the complexity and integrity of traditional Chinese medicine (WANG Tiejie, LUO Xu, WANG Xi et al., Quality Assessment of the Traditional Chinese Medicine Gentian by Chemical Pattern Recognition PT Acta Pharmaceutica Sinica, 1992, (6): 456-461; WANG Yang, SHEN Li, JIANG Kun et al., Study on Chemical Pattern Recognition of the quality of *Amomum villosum* PT Journal of Pharmaceutical Analysis. 2016, (10): 1863-1869). Therefore, the measurement of active ingredients such as flavonoids in the Gleditsiae Spina cannot represent the overall efficacy of the Gleditsiae Spina.

Near-infrared spectroscopy has the characteristics of fast speed, simple pre-treatment, and environmental protection and can directly measure samples in solid, liquid and gas states. At present, the near-infrared spectroscopy has been widely applied to authenticity identification, origin identification and counterfeits quantitative analysis of adulterated samples in the field of pharmacy. Chemical pattern recognition technology is a new technology for describing and classifying the chemical ingredient information in samples via computer, which satisfies the ambiguity and integrity requirements of traditional Chinese medicine ingredient information. However, in the art, currently no chemical pattern recognition method has been proposed for the Gleditsiae Spina and counterfeits thereof, therefore, how to quickly and accurately distinguish the Gleditsiae Spina and the counterfeits thereof is still a research focus in the art.

SUMMARY

In view of the deficiencies in the prior art, an object of the present application is to provide a near-infrared spectroscopy-based method for chemical pattern recognition of authenticity of a traditional Chinese medicine, Gleditsiae Spina.

To achieve the object, the present application adopts technical solutions described below.

The present application provides a near-infrared spectroscopy-based method for chemical pattern recognition of authenticity of a traditional Chinese medicine, Gleditsiae Spina. The method includes steps described below.

(1) Near-infrared spectrums of samples of the Gleditsiae Spina and counterfeits thereof are collected, and the internal reference background is removed, and spectrums are collected at three different positions on the surface of each of the samples to obtain an average spectrum as an original spectrum.

(2) Interference peaks in the original spectrum are removed to obtain peaks within spectral bands of 11800-7500 $cm^{-1}$, 6500-5500 $cm^{-1}$, and 5000-4200 $cm^{-1}$, and peaks within the spectral band of 5000-4200 $cm^{-1}$ are selected as model analysis peaks and pre-treated by using a first derivative pre-treatment method.

(3) Characteristic wave number points within a range of 5000-4200 $cm^{-1}$ subjected to first derivative pre-treatment are screened by using a successive projections algorithm, and the Gleditsiae Spina and the counterfeits thereof to be discriminated are divided into samples in a training set and samples in a test set according to the characteristic wave number points by using a Kennard-Stone algorithm.

(4) A discriminant model is established based on the samples in the training set, and a total of five characteristic wave number points, $x_8$, $x_{13}$, $x_{16}$, $x_{19}$, and $x_{21}$, are extracted by using a step-by-step method and applied to establish the following discriminant functions:

$$F_1 = 36387.907x_8 + 24242.533x_{13} + 9262.246x_{16} + 11456.025x_{19} + 13209.943x_{21} + 3.210, \text{ and}$$

$$F_2 = -43757.506x_8 + 40701.987x_{13} + 24623.897x_{16} + 28906.269x_{19} - 20234.651x_{21} + 4.496.$$

(5) A total of five characteristic wave number points, $x_8$, $x_{13}$, $x_{16}$, $x_{19}$, and $x_{21}$, of the samples in the test set are substituted into the discriminant functions obtained in step (4) to discriminate discriminant accuracies of the Gleditsiae Spina and the counterfeits thereof.

In the present application, the near-infrared spectrum collection method, the first derivative pre-treatment method, the successive projections algorithm, the Kennard-Stone algorithm, and the step-by-step algorithm are combined to implement the chemical pattern recognition of the authenticity of the traditional Chinese medicine, Gleditsiae Spina. The results from the discriminant method are accurate and reliable, so that the Gleditsiae Spina and the counterfeits thereof can be accurately discriminated though such method, which provides a scientific basis for quality assessment of the Gleditsiae Spina.

Preferably, the counterfeits in step (1) are spines of *Gleditsia japonica* Miq., spines of *Gleditsia microphylla* Gordon ex YT Lee and *Rubus cochinchinensis* Tratt.

Preferably, in step (1), the near-infrared spectrum collection range is 12000-4000 cm$^{-1}$, the instrumental resolution is 4 cm$^{-1}$, and the number of scans is 32.

Preferably, the interference peaks in step (2) are peaks within spectral bands of 12000-11800 cm$^{-1}$, 4200-4000 cm$^{-1}$, 7500-6500 cm$^{-1}$, and 5500-5000 cm$^{-1}$. The peaks within spectral bands of 12000-11800 cm$^{-1}$ and 4200-4000 cm$^{-1}$ are inaccurate peaks in the near-infrared spectrum which may be caused by unsteady instruments and some external reasons, and the peaks within spectral bands of 7500-6500 cm$^{-1}$ and 5500-5000 cm$^{-1}$ are peaks of water. These interference peaks are thus removed in analyses.

In the present application, the interference peaks are removed to obtain the peaks within three spectral bands of 11800-7500 cm$^{-1}$, 6500-5500 cm$^{-1}$, and 5000-4200 cm$^{-1}$, where a discriminant model established based on peaks within spectral bands of 11800-7500 cm$^{-1}$ and 6500-5500 cm$^{-1}$ cannot accurately discriminate between authentic products and the counterfeits, and a discriminant model established based on peaks within a spectral band of 5000-4200 cm$^{-1}$ can accurately discriminate between the authentic products and the counterfeits.

In the present application, the characteristic wave number points (that is, characteristic variables) within the range of 5000-4200 cm$^{-1}$ are screened by using the successive projections algorithm. A spectral interval of 11800-7500 cm$^{-1}$ includes 2230 variables, a spectral interval of 6500-5500 cm$^{-1}$ includes 519 variables, and a spectral interval of 5000-4200 cm$^{-1}$ includes 416 variables. The successive projections algorithm is used for effectively compressing data to eliminate the interference of collinear data on the model and greatly reduce the complexity of the model, thereby facilitating modeling.

In the present application, the step-by-step method is used for gradually applying variables. A step-by-step rule uses a minimum F value method. When an F value is greater than 3.84, variables with large influence on classification are added. When the F value is less than 2.71, variables with small influence on classification are removed. A false positive rate is reduced and an accuracy of the model is improved.

In the present application, in step (2), the peaks within the spectral band of 5000-4200 cm$^{-1}$ are pre-treated by using the first derivative pre-treatment method, which has a higher modeling accuracy. The first derivative pre-treatment method has higher modeling accuracy in comparison with using Savitzky-Golay (SG) smoothing, vector normalization (VN), min max normalization (MMN), second derivative (2nd D) for the pre-treatment.

Preferably, the samples in the training set in step (3) include 32 batches of samples, comprising 24 batches of Gleditsiae Spina, 3 batches of spines of *Gleditsia japonica* Miq., 2 batches of spines of *Gleditsia microphylla* Gordon ex YT Lee and 3 batches of *Rubus cochinchinensis* Tratt., and the samples in the test set include 11 batches of samples, comprising 8 batches of Gleditsiae Spina, 1 batch of spines of *Gleditsia japonica* Miq., 1 batch of spines of *Gleditsia microphylla* Gordon ex YT Lee and 1 batch of *Rubus cochinchinensis* Tratt.

To validate a discriminant accuracy of the method in the present application on the authenticity of the traditional Chinese medicine, Gleditsiae Spina, a systematic cluster analysis is performed by using a cluster analysis on the five characteristic wave number points extracted by using the step-by-step method in step (4).

Preferably, the cluster analysis adopts a method of a sum of squared deviations, and a distance measure is a squared Euclidean distance.

In the present application, the cluster analysis shows that the extracted five characteristic wave numbers can accurately and effectively discriminate the Gleditsiae Spina from the counterfeits thereof and can discriminate between different categories of counterfeits.

In the present application, to further validate the discriminant accuracy of the method in the present application on the authenticity of the traditional Chinese medicine, Gleditsiae Spina, a back propagation (BP) neural network model is used for validating accuracies of pattern recognition results of the characteristic wave number points obtained in step (3).

Preferably, the BP neural network model uses the characteristic wave number points extracted by using the successive projections algorithm as inputs of a neural network. A node in an input layer is a number of characteristic wave number points, 10 nodes exist in a hidden layer, and 4 nodes exist in an output layer to establish the BP neural network model.

In the present application, a code of the Gleditsiae Spina is [1 0 0 0], a code of the spine of *Gleditsia japonica* Miq. is [0 1 0 0], a code of the spine of *Gleditsia microphylla* Gordon ex Y. T. Lee is [0 0 1 0], and a code of *Rubus cochinchinensis* Tratt. is [0 0 0 1]. A learning algorithm of the neural network is a conjugate gradient algorithm. A Levenberg-Marquardt algorithm is selected as a training rule. A random method is used for dividing a sample set into a training set, a validation set, and a test set. To screen the best modeling conditions, the data in the training set is used for establishing BP neural network models under different spectral ranges and different pre-treatment methods. To further check predictive effects of the BP neural network models, the samples in the validation set and the test set are used for validating recognition abilities of the BP neural network models. Results show that when the spectral interval of 5000-4200 cm$^{-1}$ is selected and the first derivative pre-treatment method is used, classification accuracies of the model on the training set, the validation set, and the test set are all 100%, indicating that the established BP artificial neural network model can effectively identify the Gleditsiae Spina and the counterfeits thereof.

As a preferred technical method of the present application, the near-infrared spectroscopy-based method for chemical pattern recognition of authenticity of a traditional Chinese medicine, Gleditsiae Spina, specifically includes steps described below.

(1) The near-infrared spectrums of the samples of the Gleditsiae Spina and the counterfeits thereof, the spine of *Gleditsia japonica* Miq., the spine of *Gleditsia microphylla* Gordon ex YT Lee and *Rubus cochinchinensis* Tratt., are collected, where the collection range is 12000-4000 cm$^{-1}$, the instrumental resolution is 4 cm$^{-1}$, and the number of scans is 32; the internal reference background is removed, and the spectrums are collected at three different positions on the surface of each of the samples to obtain the average spectrum as the original spectrum.

(2) The interference peaks within the spectral bands of 12000-11800 cm$^{-1}$, 4200-4000 cm$^{-1}$, 7500-6500 cm$^{-1}$, and 5500-5000 cm$^{-1}$ in the original spectrum are removed to obtain the peaks within the spectral bands of 11800-7500 cm$^{-1}$, 6500-5500 cm$^{-1}$, and 5000-4200 cm$^{-1}$, and the peaks within the spectral band of 5000-4200 cm$^{-1}$ are selected as the model analysis peaks and pre-treated by using the first derivative pre-treatment method.

(3) The characteristic wave number points within the range of 5000-4200 cm$^{-1}$ subjected to the first derivative pre-treatment are screened by using the successive projections algorithm, and the Gleditsiae Spina and the counterfeits thereof, the spine of *Gleditsia japonica* Miq., the spine of *Gleditsia microphylla* Gordon ex YT Lee and *Rubus cochinchinensis* Tratt., to be discriminated are divided into the samples in the training set and the samples in the test set by using the Kennard-Stone algorithm according to the characteristic wave number points, where the samples in the training set include the 32 batches of samples, comprising 24 batches of Gleditsiae Spina, 3 batches of spines of *Gleditsia japonica* Miq., 2 batches of spines of *Gleditsia microphylla* Gordon ex YT Lee and 3 batches of *Rubus cochinchinensis* Tratt., and the samples in the test set include the 11 batches of samples, comprising 8 batches of Gleditsiae Spina, 1 batch of spines of *Gleditsia japonica* Miq., 1 batch of spines of *Gleditsia microphylla* Gordon ex YT Lee and 1 batch of *Rubus cochinchinensis* Tratt.

(4) The discriminant model is established based on the samples in the training set, and the total of five characteristic wave number points, $x_8$, $x_{13}$, $x_{16}$, $x_{19}$, and $x_{21}$, are extracted by using the step-by-step method and applied to establish the following discriminant functions:

$$F_1 = 36387.907x_8 + 24242.533x_{13} + 9262.246x_{16} + 11456.025x_{19} + 13209.943x_{21} + 3.210, \text{ and}$$

$$F_2 = -43757.506x_8 + 40701.987x_{13} + 24623.897x_{16} + 28906.269x_{19} - 20234.651x_{21} + 4.496.$$

(5) The total of five characteristic wave number points, $x_8$, $x_{13}$, $x_{16}$, $x_{19}$, and $x_{21}$, of the samples in the test set are substituted into the discriminant functions obtained in step (4) to discriminate the discriminant accuracies of the Gleditsiae Spina and the counterfeits thereof.

(6) The systematic cluster analysis is performed by using the cluster analysis on the five characteristic wave number points extracted by using the step-by-step method in step (4) to validate discriminant accuracies of the obtained discriminant functions, and the BP neural network model is used for validating the accuracies of the pattern recognition results of the characteristic wave number points obtained in step (3). The cluster analysis adopts the method of the sum of squared deviations, and the distance measure is the squared Euclidean distance. The BP neural network model uses the characteristic wave number points extracted by using the successive projections algorithm as the inputs of the neural network. The node in the input layer is the number of characteristic wave number points, 10 nodes exist in the hidden layer, and 4 nodes exist in the output layer to establish the BP neural network model.

Compared with the existing art, the present application has beneficial effects described below. The method of the present application for chemical pattern recognition of authenticity of the traditional Chinese medicine, Gleditsiae Spina, employs the near-infrared spectrum collection method, the first derivative pre-treatment method, the successive projections algorithm, the Kennard-Stone algorithm, and the step-by-step algorithm to perform the chemical pattern recognition on the authenticity of the traditional Chinese medicine, Gleditsiae Spina, so that a result of a recognition method is accurate and reliable, and the Gleditsiae Spina and the counterfeits thereof can be accurately discriminated. The present application has established a near-infrared spectroscopy-based method for chemical pattern recognition of qualities of the Gleditsiae Spina for the first time, which can accurately discriminate the Gleditsiae Spina from the counterfeits thereof, and provides the scientific basis for the quality assessment of the Gleditsiae Spina.

The present application has firstly established the chemical pattern recognition method for discriminating the Gleditsiae Spina from the counterfeits thereof by adopting the cluster analysis, discriminant analysis, and BP neural network analysis technologies. Through this method, the subjectivity of traditional identification methods has been overcome, and this method has more scientificity and comprehensiveness.

DETAILED DESCRIPTION

Figure 1:
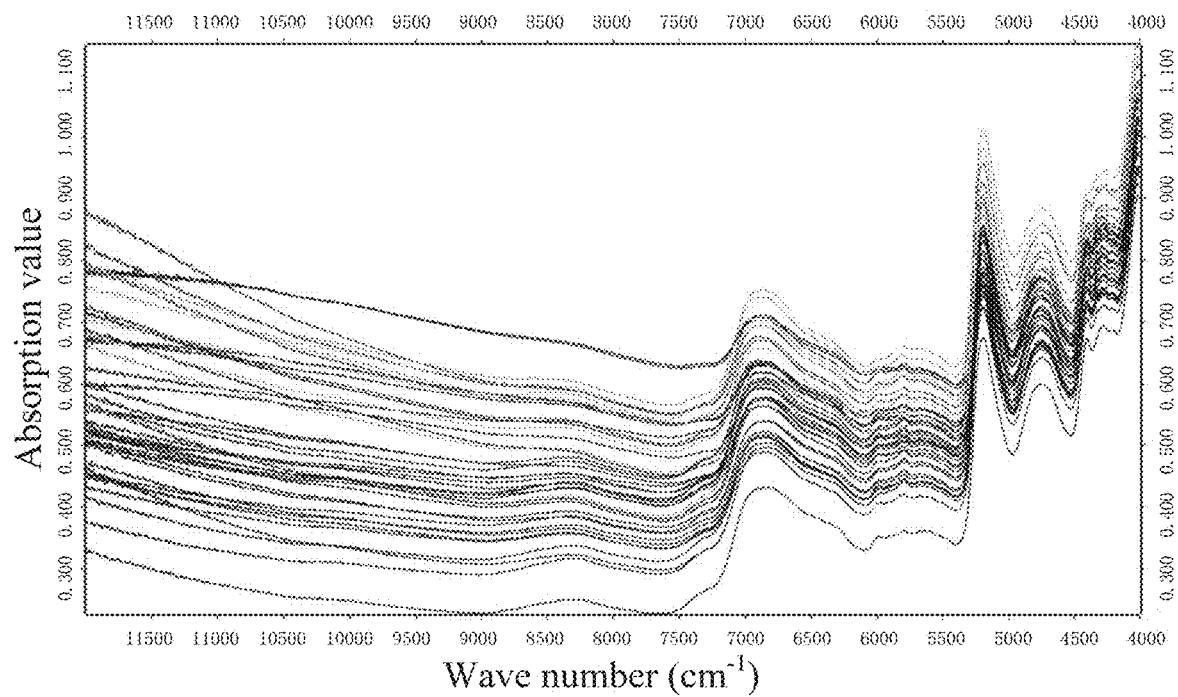
FIG. 1 is a diagram of original average near-infrared spectrums obtained by collecting infrared spectrums of samples of a Gleditsiae Spina and counterfeits thereof including a spine of *Gleditsia japonica* Miq., a spine of *Gleditsia microphylla* Gordon ex YT Lee and *Rubus cochinchinensis* Tratt. in the present application.
Figure 2A:
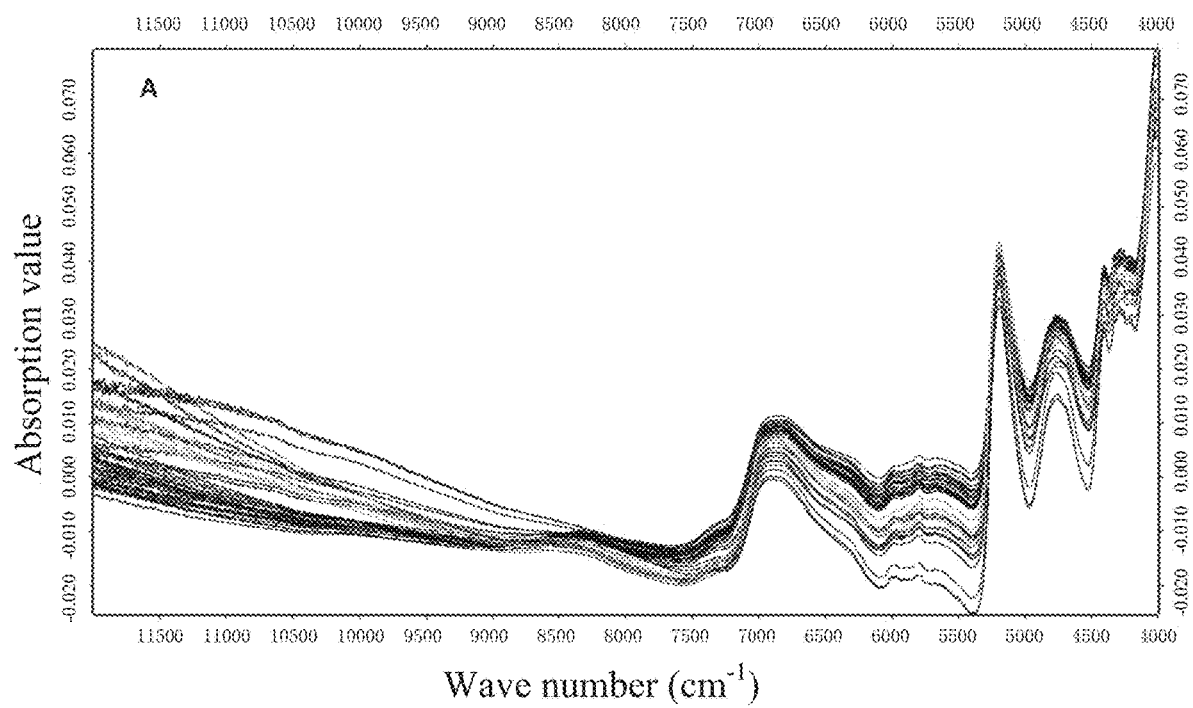
FIG. 2A is a near-infrared spectrum diagram obtained after the pre-treatment of original average near-infrared spectrums using Savitzky-Golay (SG) smoothing and vector normalization (VN) methods.
Figure 2B:
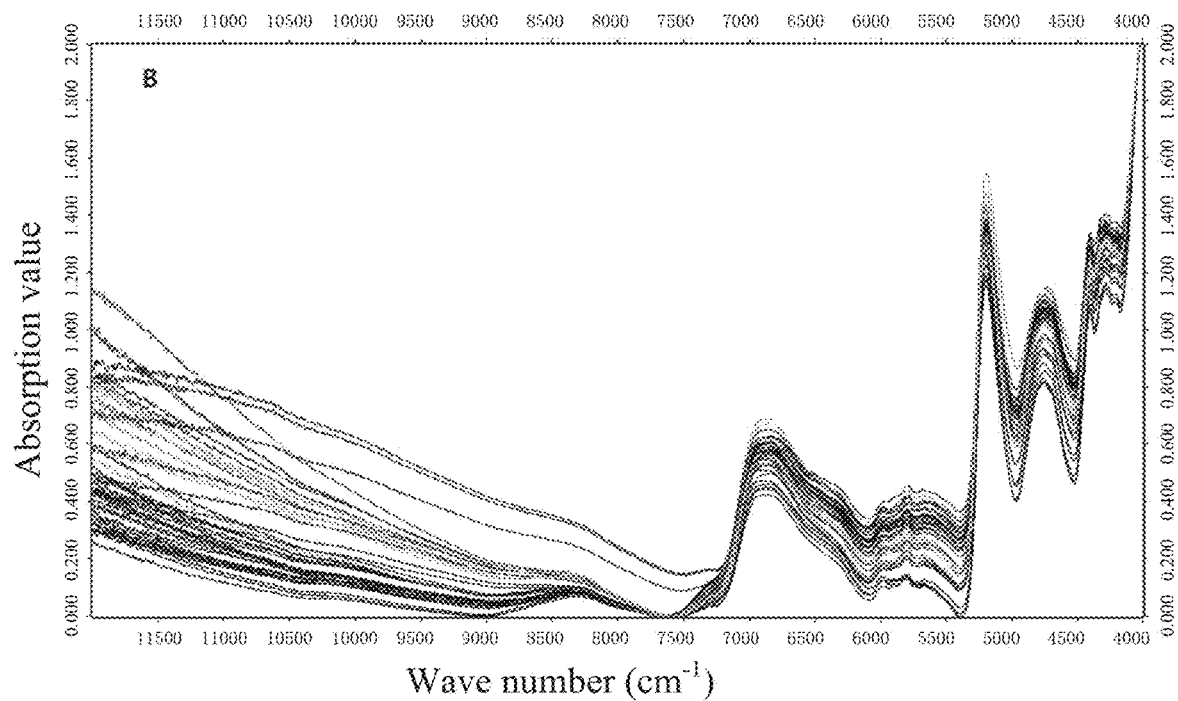
FIG. 2B is a near-infrared spectrum diagram obtained after the pre-treatment of original average near-infrared spectrums using Savitzky-Golay (SG) smoothing and min max normalization (MMN) methods.
Figure 2C:
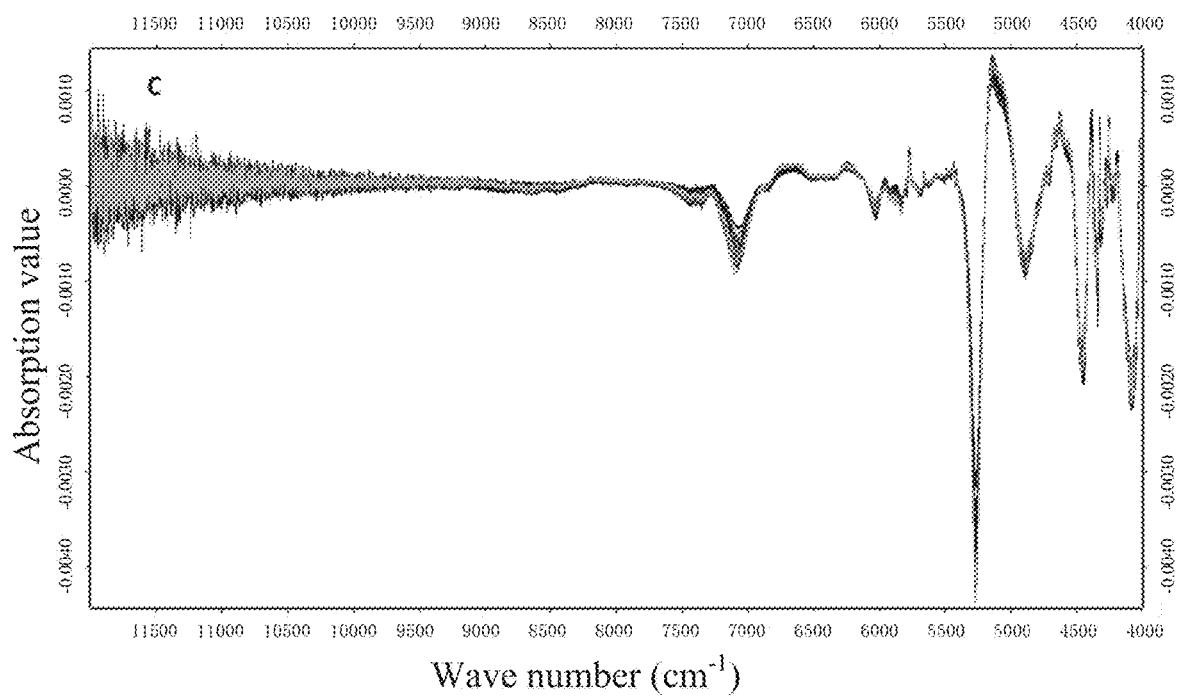
FIG. 2C is a near-infrared spectrum diagram obtained after the pre-treatment of original average near-infrared spectrums using a first derivative (1st D) method.
Figure 2D:
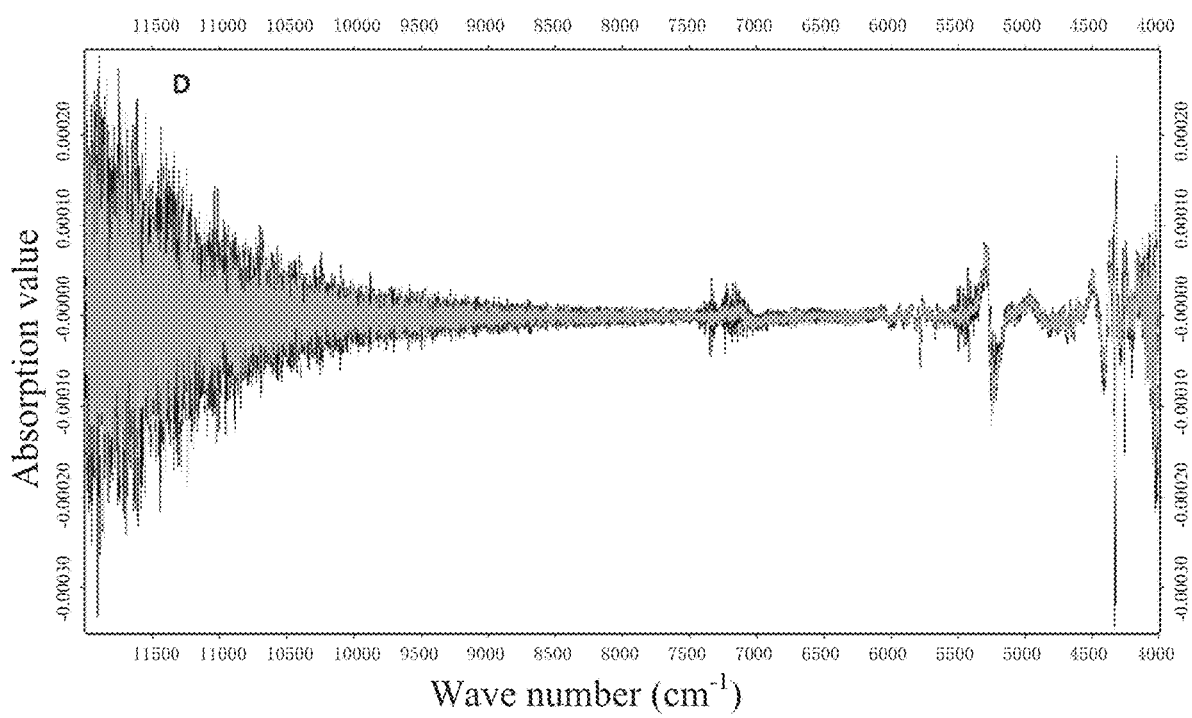
FIG. 2D is a near-infrared spectrum diagram obtained after the pre-treatment of original average near-infrared spectrums using a second derivative (2nd D) method.

The technical solutions of the present application are further described below through specific embodiments. Those skilled in the art should understand that the embodiments are merely used for helping understand the present application and should not be regarded as the specific limitations to the present application.

Embodiment One

In this embodiment, the following instruments and software were used: a VERTEX 70 Fourier transform near-infrared spectrometer (Bruker, Germany) with indium gallium arsenide (InGaAS) detector; an RT-04A high-speed pulverizer (Hongquan Pharmaceutical Machinery Company, Hong Kong). OPUS 6.5 software (Bruker, Germany) was used for spectral data pre-processing. For the operation of the successive projections algorithm and the Kennard-Stone algorithm as well as for the establishment of the back propagation (BP) neural network was Matlab R2014a software (Mathworks, USA) employed, and SPSS 21.0 software (IBM Corporation, USA) was for the cluster analysis and the discriminant analysis.

In this embodiment, the following samples were used: 43 samples were collected in total, comprising 32 batches of spines of *Gleditsia sinensis* Lam., 4 batches of spines of *Gleditsia japonica* Miq., 3 batches of spines of *Gleditsia microphylla* Gordon ex YT Lee, and 4 batches of *Rubus* cochinchinensis Tratt. The above samples have been identified as authentic Gleditsiae Spina and various categories of typical counterfeits. These samples were dried, pulverized and sieved through a 50-mesh sieve for later use. Information on origins of the samples was listed in Table 1.

TABLE 1

| No. | Specis | Origin | Specification |
|---|---|---|---|
| 1 | Gleditsia sinensis Lam. | Zuoshui, Shaanxi | Crug drugs |
| 2 | Gleditsia sinensis Lam. | Yuncheng, Shanxi | Medicinal material |
| 3 | Gleditsia sinensis Lam. | Zaozhuang, Shandong | Medicinal material |
| 4 | Gleditsia sinensis Lam. | Tai'an, Shandong | Medicinal material |
| 5 | Gleditsia sinensis Lam. | Shandong | Decoction piece |
| 6 | Gleditsia sinensis Lam. | Shandong | Decoction piece |
| 7 | Gleditsia sinensis Lam. | Shandong | Medicinal material |
| 8 | Gleditsia sinensis Lam. | Shandong | Medicinal material |
| 9 | Gleditsia sinensis Lam. | Xiangyang, Hubei | Medicinal material |
| 10 | Gleditsia sinensis Lam. | Wuhan, Hubei | Medicinal material |
| 11 | Gleditsia sinensis Lam. | Wuhan, Hubei | Medicinal material |
| 12 | Gleditsia sinensis Lam. | Luoyang, Henan | Medicinal material |
| 13 | Gleditsia sinensis Lam. | Luoyang, Henan | Medicinal material |
| 14 | Gleditsia sinensis Lam. | Luoyang, Henan | Medicinal material |
| 15 | Gleditsia sinensis Lam. | Luoyang, Henan | Medicinal material |
| 16 | Gleditsia sinensis Lam. | Henan | Decoction piece |
| 17 | Gleditsia sinensis Lam. | Henan | Medicinal material |
| 18 | Gleditsia sinensis Lam. | Henan | Decoction piece |
| 19 | Gleditsia sinensis Lam. | Henan | Medicinal material |
| 20 | Gleditsia sinensis Lam. | Henan | Decoction piece |
| 21 | Gleditsia sinensis Lam. | Henan | Medicinal material |
| 22 | Gleditsia sinensis Lam. | Xinle, Hebei | Medicinal material |
| 23 | Gleditsia sinensis Lam. | Bozhou, Anhui | Medicinal material |
| 24 | Gleditsia sinensis Lam. | Guangxi | Medicinal material |
| 25 | Gleditsia sinensis Lam. | Beijing | Medicinal material |
| 26 | Gleditsia sinensis Lam. | Beijing | Medicinal material |
| 27 | Gleditsia sinensis Lam. | Beijing | Medicinal material |
| 28 | Gleditsia sinensis Lam. | Beijing | Medicinal material |
| 29 | Gleditsia sinensis Lam. | Beijing | Medicinal material |
| 30 | Gleditsia sinensis Lam. | Beijing | Medicinal material |
| 31 | Gleditsia sinensis Lam. | Beijing | Medicinal material |
| 32 | Gleditsia sinensis Lam. | Beijing | Medicinal material |
| 33 | Gleditsia japonica Miq. | Dalian, Liaoning | Medicinal material |
| 34 | Gleditsia japonica Miq. | Wuhan, Hubei | Medicinal material |
| 35 | Gleditsia japonica Miq. | Changchun, Jilin | Decoction piece |
| 36 | Gleditsia japonica Miq. | Tai'an, Shandong | Medicinal material |
| 37 | Gleditsia microphylla Gordon ex Y T Lee | Guangdong | Decoction piece |
| 38 | Gleditsia microphylla Gordon ex Y T Lee | Shanxi | Decoction piece |
| 39 | Gleditsia microphylla Gordon ex Y T Lee | Guangxi | Decoction piece |
| 40 | Rubus cochinchinensis Tratt. | Guangxi | Decoction piece |
| 41 | Rubus cochinchinensis Tratt. | Guangxi | Decoction piece |
| 42 | Rubus cochinchinensis Tratt. | Guangdong | Decoction piece |
| 43 | Rubus cochinchinensis Tratt. | Yunnan | Decoction piece |

The method for chemical pattern recognition of authenticity of a traditional Chinese medicine, Gleditsiae Spina, specifically included steps described below.

(1) Spectrums of the samples of the Gleditsiae Spina and counterfeits thereof including the spine of *Gleditsia japonica* Miq., the spine of *Gleditsia microphylla* Gordon ex YT Lee and *Rubus cochinchinensis* Tratt. were collected with an optical fiber probe, where a spectrum collection range was 12000-4000 cm$^{-1}$, an instrumental resolution was 4 cm$^{-1}$, and a number of scans was 32. An internal reference background was removed, and spectrums were collected at three different positions on a surface of each sample to obtain an average spectrum as an original spectrum. The original average near-infrared spectrums were shown in FIG. 1.

(2) After removing the interference peaks of 12000-11800 cm$^{-1}$ and 4200-4000 cm$^{-1}$ as well as the water peaks of 7500-6500 cm$^{-1}$ and 5500-5000 cm$^{-1}$, the whole spectrum was divided into 3 intervals including 11800-7500 cm$^{-1}$, 6500-5500 cm$^{-1}$ and 5000-4200 cm$^{-1}$.

Pre-Treatment of the Original Average Near-Infrared Spectrums

At first, the pre-treatment methods were screened. The screened pre-treatment methods included Savitzky-Golay (SG) smoothing, vector normalization (VN), min max normalization (MMN), first derivative (1st D) and second derivative (2nd D) methods. These pre-treatment methods and some combinations thereof were used for the pre-treatment of original spectrums of the samples, to examine effects of different pre-treatment methods on a modeling accuracy. Spectrums subjected to the pre-treatment were shown in FIG. 2.

The successive projections algorithm was used for screening characteristic wave number points (characteristic variables) within each of the intervals. The data extracted by using the successive projections algorithm were used as independent variables to establish a stepwise discriminant analysis method. Wilks' Lambda was used as an index for gradually applying variables to establish a typical discriminant function equation. A discriminative classification probability of the Gleditsiae Spina and various categories of counterfeits thereof were determined according to discriminant scores of typical functions of the Gleditsiae Spina and the counterfeits thereof. The classification accuracies under the various methods were listed in Table 2. It can be known from Table 2 that for a spectral band of 5000-4200 cm$^{-1}$, no matter whether the original spectrums, SG+VN, or the first derivative was used for data pre-processing to establish a discriminant analysis model, the classification accuracies of the Gleditsiae Spina and the counterfeits thereof were all 100%.

TABLE 2

Classification accuracies of discriminant analyses

| Pre-treatment method | Spectral range (cm$^{-1}$) | Accuracy (%) |
|---|---|---|
| Original spectrums | 11800-7500 | 81.3 |
|  | 6500-5500 | 81.3 |
|  | 5000-4200 | 100.0 |
| SG + VN | 11800-7500 | 78.1 |
|  | 6500-5500 | 65.6 |
|  | 5000-4200 | 100.0 |
| SG + MMN | 11800-7500 | 68.8 |
|  | 6500-5500 | 78.1 |
|  | 5000-4200 | 93.8 |
| 1st D | 11800-7500 | 34.4 |
|  | 6500-5500 | 90.6 |
|  | 5000-4200 | 100.0 |
| 2nd D | 11800-7500 | 78.1 |
|  | 6500-5500 | 40.6 |
|  | 5000-4200 | 96.9 |

To validate the effectiveness of the discriminant model, the internal cross-validation method was used for examining a discriminant result. As shown in Table 3, when the spectral band of 5000-4200 cm$^{-1}$ was selected and the original spectrums were used, 1 case of *Rubus cochinchinensis* Tratt. was misclassified as the authentic Gleditsiae Spina, and the cross-validation accuracy was 96.9%; when the spectral band of 5000-4200 cm$^{-1}$ was selected and SG+VN pretreatment methods were used, 3 cases of the spine of *Gleditsia japonica* Miq. were mistaken, where one was mistaken as the authentic Gleditsiae Spina, one was mistaken as the spine of *Gleditsia microphylla* Gordon ex Y. T. Lee, and one was mistaken as *Rubus cochinchinensis* Tratt., and the cross-validation accuracy was 90.6%; and when the spectral band of 5000-4200 cm$^{-1}$ was selected and the first derivative pre-treatment method was used, no cases were mistaken, and the cross-validation accuracy was 100%. It can be seen that the discriminant model has good effectiveness.

TABLE 3

Cross-validation accuracy of the discriminant analyses

| Method | | Species | Composition of a predictive group | | | | Total |
|---|---|---|---|---|---|---|---|
| | | | GS | GJ | GM | RC | |
| 5000-4200 cm$^{-1}$, Original spectrums | Number | GS | 24 | 0 | 0 | 0 | 24 |
| | | GJ | 0 | 3 | 0 | 0 | 3 |
| | | GM | 0 | 0 | 2 | 0 | 2 |
| | | RC | 1 | 0 | 0 | 2 | 3 |
| | % | GS | 100.0 | 0.0 | 0.0 | 0.0 | 100.0 |
| | | GJ | 0.0 | 100.0 | 0.0 | 0.0 | 100.0 |
| | | GM | 0.0 | 0.0 | 100.0 | 0.0 | 100.0 |
| | | RC | 33.3 | 0.0 | 0.0 | 66.7 | 100.0 |
| 5000-4200 cm$^{-1}$, SG + VN | Number | GS | 24 | 0 | 0 | 0 | 24 |
| | | GJ | 1 | 0 | 1 | 1 | 3 |
| | | GM | 0 | 0 | 2 | 0 | 2 |
| | | RC | 0 | 0 | 0 | 3 | 3 |
| | % | GS | 100.0 | 0.0 | 0.0 | 0.0 | 100.0 |
| | | GJ | 33.3 | 0.0 | 33.3 | 33.3 | 100.0 |
| | | GM | 0.0 | 0.0 | 100.0 | 0.0 | 100.0 |
| | | RC | 0.0 | 0.0 | 0.0 | 100.0 | 100.0 |
| 5000-4200 cm$^{-1}$, 1st D | Number | GS | 24 | 0 | 0 | 0 | 24 |
| | | GJ | 0 | 3 | 0 | 0 | 3 |
| | | GM | 0 | 0 | 2 | 0 | 2 |
| | | RC | 0 | 0 | 0 | 3 | 3 |
| | % | GS | 100.0 | 0.0 | 0.0 | 0.0 | 100.0 |
| | | GJ | 0.0 | 100.0 | 0.0 | 0.0 | 100.0 |
| | | GM | 0.0 | 0.0 | 100.0 | 0.0 | 100.0 |
| | | RC | 0.0 | 0.0 | 0.0 | 100.0 | 100.0 |

In the above table, GS represents the Gleditsiae Spina, GJ represents the spine of *Gleditsia japonica* Miq., GM represents the spine of *Gleditsia microphylla* Gordon ex Y. T. Lee, and RC represents *Rubus cochinchinensis* Tratt. From the above-mentioned examinations of the modeling accuracy with the pre-treatment methods, it could be concluded that the first derivative pre-treatment method had higher discriminant accuracy. Therefore, the first derivative pre-treatment method was used for the pre-treatment of peaks within the spectral band of 5000-4200 cm$^{-1}$.

(3) The characteristic wave number points within the range of 5000-4200 cm$^{-1}$ subjected to first derivative pre-treatment were screened by using the successive projections algorithm, and the Gleditsiae Spina and the counterfeits thereof, the spine of GJ, the spine oGM and RC, to be discriminated were divided into samples in a training set and samples in a test set by using the Kennard-Stone algorithm according to the characteristic wave number points. The training set included 32 batches of samples, comprising 24 batches of GS, 3 batches of spines of GJ, 2 batches of spines of GM and 3 batches of RC. The test set included 11 batches of samples, comprising 8 batches of GS, 1 batch of spines of GJ, 1 batch of spines of GM and 1 batch of RC.

(4) The discriminant model was established based on the samples in the training set, and a step-by-step method was used for extracting a total of five characteristic wave number points, $x_8$, $x_{13}$, $x_{16}$, $x_{19}$, and $x_{21}$, which were applied to establish the following discriminant functions:

$$F_1 = 36387.907x_8 + 24242.533x_{13} + 9262.246x_{16} + 11456.025x_{19} + 13209.943x_{21} + 3.210$$

$$F_2 = -43757.506x_8 + 40701.987x_{13} + 24623.897x_{16} + 28906.269x_{19} - 20234.651x_{21} + 4.496.$$

(5) A total of five characteristic wave number points, $x_8$, $x_{13}$, $x_{16}$, $x_{19}$, and $x_{21}$, of the samples in the test set were substituted into the discriminant functions obtained in step (4) to discriminate the discriminant accuracies of the GS and the counterfeits thereof. That is, the 11 batches of samples in the test set were substituted into the discriminant functions to discriminate classification situations of the GS and the counterfeits thereof. Results were listed in Table 4, where a discriminant accuracy of the 11 batches of samples was 100%. It indicated that the established typical discriminant functions could accurately identify the GS and categories of the counterfeits thereof.

TABLE 4

External validation results of the discriminant analyses

| Sample No. | Discriminant Score F1 | Discriminant Score F2 | Group Discriminant Result | Practical Sample |
|---|---|---|---|---|
| 1 | −1.3080 | −1.6825 | GS | GS |
| 3 | −1.1670 | −0.4243 | GS | GS |
| 4 | −2.0454 | −0.7841 | GS | GS |
| 11 | −2.6565 | −1.7953 | GS | GS |
| 27 | −0.3952 | 1.7577 | GS | GS |
| 29 | −0.8507 | −0.7956 | GS | GS |
| 31 | −3.6949 | −1.0824 | GS | GS |
| 32 | −2.6450 | 0.1140 | GS | GS |
| 33 | 1.4441 | 3.6331 | GJ | GJ |
| 37 | 3.6123 | −12.8137 | GM | GM |
| 40 | 10.2410 | −0.9146 | RC | RC |

For symbols in the above table, GS represents the Gleditsiae Spina, GJ represents the spine of *Gleditsia japonica*

Miq., GM represents the spine of *Gleditsia microphylla* Gordon ex Y. T. Lee, and RC represents *Rubus cochinchinensis* Tratt.

(6) Cluster Analysis

Figure 3:
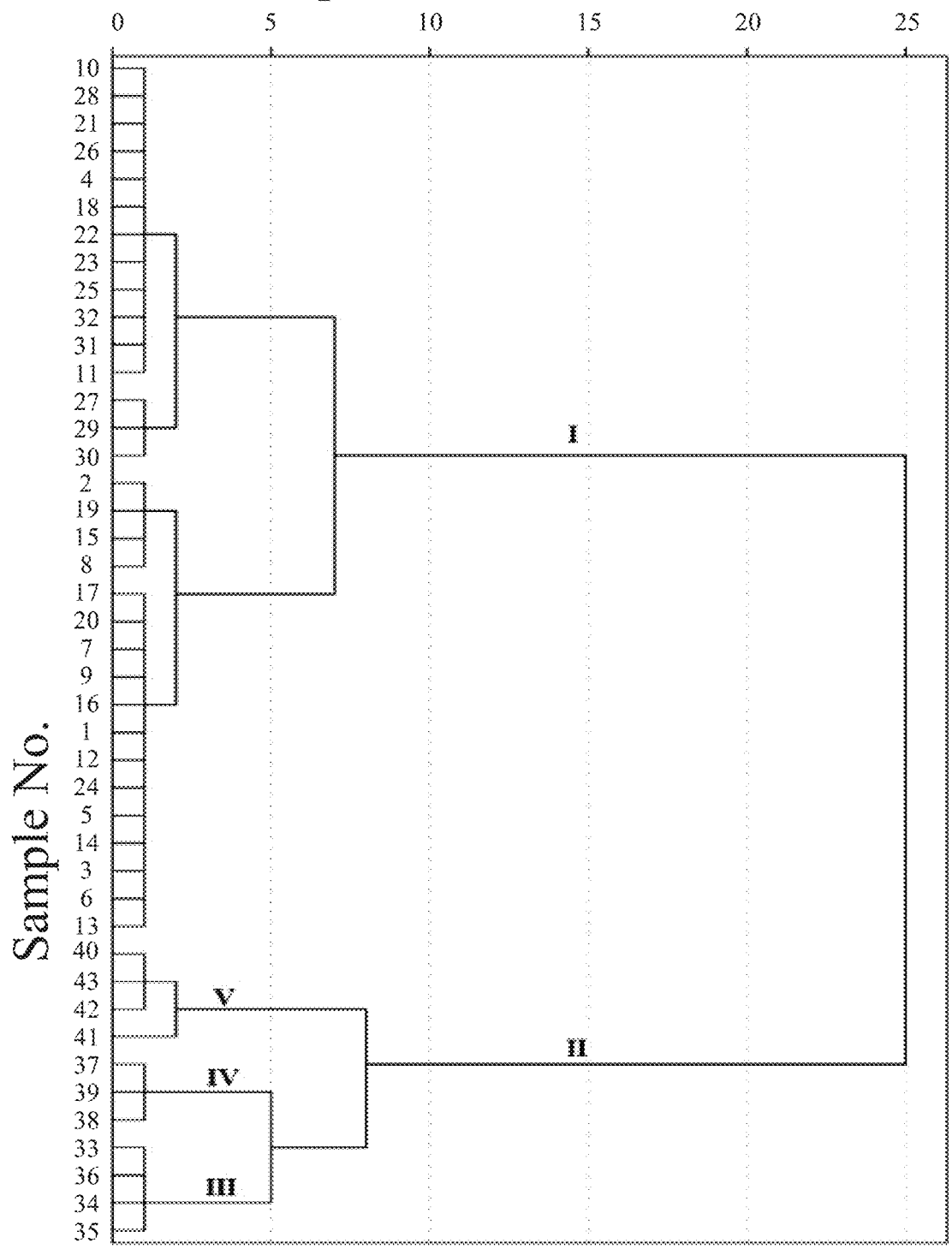
FIG. 3 is a diagram of results of a cluster analysis in the present application.

To further validate the scientificity of screening characteristic wave numbers and the rationality of the discriminant analysis model, the systematic cluster analysis was performed on the five characteristic variables extracted by using the step-by-step method. The cluster method was the sum of squared deviations and the distance measure was the squared Euclidean distance. A dendrogram of cluster results was shown in FIG. 3. It can be seen from FIG. 3 that authentic GS No. 1-32 were clustered into class I and counterfeits No. 33-43 were clustered into class II, where counterfeits No. 33-36 were samples of the spine of GJ and clustered into class III, counterfeits No. 37-39 were samples of the spine of GM and clustered into class IV, and counterfeits No. 40-43 were samples of RC and clustered into class V. The cluster results were consistent with characteristic identification results. The cluster results showed that the extracted five characteristic wave numbers could accurately and effectively discriminate the GS from the counterfeits thereof and could discriminate between different categories of counterfeits.

(7) BP Neural Network Analysis

The characteristic variables extracted by using the successive projections algorithm were used as inputs of a neural network. A node in an input layer was a number of characteristic variables, 10 nodes existed in a hidden layer, and 4 nodes existed in an output layer. A three-layer BP neural network model was established. A code of the GS was [1 0 0 0], a code of the spine of GJ was [0 1 0 0], a code of the spine of GM was [0 0 1 0], and a code of RC was [0 0 0 1]. A learning algorithm of the neural network was a conjugate gradient algorithm. A Levenberg-Marquardt algorithm was selected as a training rule. A random method was used for dividing a sample set into a training set, a validation set, and a test set. To screen best modeling conditions, data in the training set was used for establishing BP neural network models under different spectral ranges and different pre-treatment methods. To further check predictive effects of the BP neural network models, samples in the validation set and the test set were used for validating recognition abilities of the BP neural network models. The classification results were listed in Table 5. The results showed that when a spectral interval of 5000-4200 $cm^{-1}$ was selected and the first derivative pre-treatment method was used, classification accuracies of the model on the training set, the validation set, and the test set were all 100%, indicating that the established BP artificial neural network model could effectively identify the Gleditsiae Spina and the counterfeits thereof.

TABLE 5

Classification recognition results of the BP neural network

| Pre-treatment Method | Spectral Range ($cm^{-1}$) | Accuracy (%) | | |
|---|---|---|---|---|
| | | Training Set | Validation Set | Test Set |
| Original spectrums | 11800-7500 | 82.6 | 72.7 | 77.8 |
| | 6500-5500 | 87.0 | 81.8 | 88.9 |
| | 5000-4200 | 100.0 | 100.0 | 88.9 |
| SG + VN | 11800-7500 | 100.0 | 100.0 | 88.930 |
| | 6500-5500 | 100.0 | 100.0 | 66.7 |
| | 5000-4200 | 100.0 | 90.9 | 100.0 |
| SG + MMN | 11800-7500 | 100.0 | 90.9 | 77.8 |
| | 6500-5500 | 100.0 | 100.0 | 88.9 |
| | 5000-4200 | 100.0 | 100.0 | 66.7 |

TABLE 5-continued

Classification recognition results of the BP neural network

| Pre-treatment Method | Spectral Range ($cm^{-1}$) | Accuracy (%) | | |
|---|---|---|---|---|
| | | Training Set | Validation Set | Test Set |
| 1st D | 11800-7500 | 82.6 | 100.0 | 66.7 |
| | 6500-5500 | 100.0 | 90.9 | 100.0 |
| | 5000-4200 | 100.0 | 100.0 | 100.0 |
| 2nd D | 11800-7500 | 100.0 | 63.6 | 66.7 |
| | 6500-5500 | 91.3 | 81.8 | 44.4 |
| | 5000-4200 | 100.0 | 100.0 | 77.8 |

In can be seen from the analyses described above that a near-infrared spectrum collection method, the successive projections algorithm, the first derivative pre-treatment method, the Kennard-Stone algorithm, and a step-by-step algorithm were combined in the present application to obtain an accurate and reliable result of a discriminant method, and the Gleditsiae Spina and the counterfeits thereof could be accurately discriminated.

In the present application, the optical fiber probe was used for sampling, which could cause noise interference to front and rear spectral bands, so impure peaks within the spectral bands of 12000-11800 $cm^{-1}$ and 4200-4000 $cm^{-1}$ were removed. Relatively strong and wide water-absorbing peaks existed at 6897 $cm^{-1}$ and 5181 $cm^{-1}$. To avoid an overlap of water peak information and sample information, water-absorbing peaks within the intervals of 7500-6500 $cm^{-1}$ and 5500-5000 $cm^{-1}$ were removed.

A near-infrared spectral data volume in the present application was complex. The spectral interval of 11800-7500 $cm^{-1}$ included 2230 variables, the spectral interval of 6500-5500 $cm^{-1}$ included 519 variables, and the spectral interval of 5000-4200 $cm^{-1}$ included 416 variables. The successive projections algorithm was used for effectively compressing data to eliminate the interference of collinear data on the model and greatly reduce the complexity of the model, thereby facilitating the modeling. In a stepwise discriminant analysis method, the step-by-step method was used for gradually applying variables. A step-by-step rule used a minimum F value method. When an F value was greater than 3.84, variables with large influence on classification were added. When the F value was less than 2.71, variables with small influence on classification were removed. A false positive rate was reduced and an accuracy of the model was improved.

The Savitzky-Golay smoothing method could effectively smooth high-frequency noise and improve a signal-to-noise ratio. Vector normalization and min max normalization were used for correcting spectral errors of the samples due to particle scattering. The first and second derivatives were respectively used for eliminating the translation and drift of baselines in the spectrums and improving the resolution and sensitivity. In the examination of the pre-treatment methods, it was found that the use of the 1st D pre-treatment method can make discriminant results of the model more accurate.

The results of the cluster analysis showed that the authentic Gleditsiae Spina were mainly divided into two categories: samples No. 10, 11, 21, 18, 25, 26, 27, 28, 29, 30, 31, 32, 22, 4 and 23 from Wuhan Hubei, Henan, Beijing, Xinle Hebei, Tai'an Shandong, and Bozhou Anhui were clustered into one category, indicating that qualities of the Gleditsiae Spina of the above origins were similar; and samples No. 12, 13, 14, 15, 16, 17, 19, 20, 5, 6, 7, 8, 1, 2, 3, 9 and 24 from Luoyang Henan, Zaozhuang Shandong, Zuoshui Shaanxi, Yuncheng Shanxi, Xiangyang Hubei, and Guangxi were clustered into one category, indicating that qualities of the Gleditsiae Spina of the above origins were similar. The above difference may be caused by factors such as growth years, and temperature, illumination, and rainfall at their origins of the Gleditsiae Spina, which need to be further studied.

The results of the BP neural network analysis showed that the BP artificial neural network had a better modeling effect. It can be seen from Table 5 that classification accuracies of all groups of models for the training set ranged from 82.6% to 100%. 11 groups of models among 15 groups of models established under different conditions had a classification accuracy of 100% on the training set, predictive accuracies of the all groups of models on the validation set ranged from 63.6% to 100%, and predictive accuracies of the all groups of models on the test set ranged from 44.4% to 100%. Multiple groups of models had the classification accuracy of 100% on the validation set and the test set, separately. After optimization and screening, when the spectral range of 5000-4200 cm$^{-1}$ was selected and the 1st D was used for the data preprocessing, the model established was an optimal BP neural network model, which had the classification accuracy of 100% on all the training set, the validation set, and the test set.

Although the present application described the method for chemical pattern recognition of authenticity of the traditional Chinese medicine, Gleditsiae Spina of the present application through the embodiments described above, the present application is not limited to the embodiments described above, which means that implementation of the present application does not necessarily depend on the embodiments described above. It should be apparent to those skilled in the art that any improvements made to the present application, equivalent replacements of selected raw materials and additions of adjuvant ingredients in the present application, and selections of specific manners, etc., all fall within the protection scope and the disclosed scope of the present application.

What is claimed is:

1. A near-infrared spectroscopy-based method for chemical pattern recognition of authenticity of a traditional Chinese medicine, Gleditsiae Spina, comprising:
   (1) collecting near-infrared spectrums of samples of the Gleditsiae Spina and counterfeits thereof, removing an internal reference background, and collecting spectrums at three different positions on a surface of each of the samples to obtain an average spectrum as an original spectrum;
   (2) removing interference peaks in the original spectrum to obtain peaks within spectral bands of 11800-7500 cm$^{-1}$, 6500-5500 cm$^{-1}$, and 5000-4200 cm$^{-1}$, selecting peaks within the spectral band of 5000-4200 cm$^{-1}$ as model analysis peaks, and pre-treating the peaks within the spectral band of 5000-4200 cm$^{-1}$ by using a first derivative (1st D) pre-treatment method;
   (3) screening characteristic wave number points within a range of 5000-4200 cm-1 subjected to the 1st D pre-treatment method by using a successive projections algorithm, and dividing the Gleditsiae Spina and the counterfeits thereof to be discriminated according to the characteristic wave number points by using a Kennard-Stone algorithm into samples in a training set and samples in a test set;
   (4) establishing a discriminant model based on the samples in the training set, extracting a total of five characteristic wave number points, $x_8$, $x_{13}$, $x_{16}$, $x_{19}$, and $x_{21}$, by using a step-by-step method, and applying the five characteristic wave number points to establish the following discriminant functions:

$$F_1 = 36387.907x_8 + 24242.533x_{13} + 9262.246x_{16} + 11456.025x_{19} + 13209.943x_{21} + 3.210, \text{ and}$$

$$F_2 = -43757.506x_8 + 40701.987x_{13} + 24623.897x_{16} + 28906.269x_{19} - 20234.651x_{21} + 4.496; \text{ and}$$

(5) substituting the total of five characteristic wave number points, $x_8$, $x_{13}$, $x_{16}$, $x_{19}$, and $x_{21}$, of the samples in the test set into the discriminant functions obtained in step (4) to discriminate discriminant accuracies of the Gleditsiae Spina and the counterfeits thereof.

2. The near-infrared spectroscopy-based method for chemical pattern recognition of authenticity of a traditional Chinese medicine, Gleditsiae Spina, of claim 1, wherein the counterfeits in step (1) are a spine of *Gleditsia japonica* Miq., a spine of *Gleditsia microphylla* Gordon ex YT Lee and *Rubus cochinchinensis* Tratt.

3. The near-infrared spectroscopy-based method for chemical pattern recognition of authenticity of a traditional Chinese medicine, Gleditsiae Spina, of claim 1, wherein the samples in the training set in step (3) comprise 32 batches of samples, wherein the 32 batches of samples comprise 24 batches of Gleditsiae Spina, 3 batches of spines of *Gleditsia japonica* Miq., 2 batches of spines of *Gleditsia microphylla* Gordon ex YT Lee and 3 batches of *Rubus cochinchinensis* Tratt., and the samples in the test set comprise 11 batches of samples, wherein the 11 batches of samples comprise 8 batches of Gleditsiae Spina, 1 batch of spines of *Gleditsia japonica* Miq., 1 batch of spines of *Gleditsia microphylla* Gordon ex YT Lee and 1 batch of *Rubus cochinchinensis* Tratt.

4. The near-infrared spectroscopy-based method for chemical pattern recognition of authenticity of a traditional Chinese medicine, Gleditsiae Spina, of claim 1, wherein in step (1), a near-infrared spectrum collection range is 12000-4000 cm$^{-1}$, an instrumental resolution is 4 cm$^{-1}$, and a number of scans is 32.

5. The near-infrared spectroscopy-based method for chemical pattern recognition of authenticity of a traditional Chinese medicine, Gleditsiae Spina, of claim 1, wherein the interference peaks in step (2) are peaks within spectral bands of 12000-11800 cm$^{-1}$, 4200-4000 cm$^{-1}$, 7500-6500 cm$^{-1}$, and 5500-5000 cm$^{-1}$.

6. The near-infrared spectroscopy-based method for chemical pattern recognition of authenticity of a traditional Chinese medicine, Gleditsiae Spina, of claim 1, wherein a systematic cluster analysis is performed by using a cluster analysis on the five characteristic wave number points extracted by using the step-by-step method in step (4) to validate the discriminant accuracies of the discriminant functions.

7. The near-infrared spectroscopy-based method for chemical pattern recognition of authenticity of a traditional Chinese medicine, Gleditsiae Spina, of claim 6, wherein the cluster analysis adopts a method of a sum of squares of deviations, and a distance measure is a squared Euclidean distance.

8. The near-infrared spectroscopy-based method for chemical pattern recognition of authenticity of a traditional Chinese medicine, Gleditsiae Spina, of claim 1, wherein a back propagation (BP) neural network model is used for validating accuracies of pattern recognition results of the characteristic wave number points obtained in step (3).

9. The near-infrared spectroscopy-based method for chemical pattern recognition of authenticity of a traditional Chinese medicine, Gleditsiae Spina, of claim 8, wherein the BP neural network model uses the characteristic wave number points extracted by using the successive projections algorithm as inputs of a neural network, where a node in an input layer is a number of characteristic wave number points, ten nodes exist in a hidden layer, and four nodes exist in an output layer to establish the BP neural network model.

10. The near-infrared spectroscopy-based method for chemical pattern recognition of authenticity of a traditional Chinese medicine, Gleditsiae Spina, of claim 1, comprising:

(1) collecting the near-infrared spectrums of the samples of the Gleditsiae Spina and the counterfeits thereof, the spine of *Gleditsia japonica* Miq., the spine of *Gleditsia microphylla* Gordon ex YT Lee and *Rubus cochinchinensis* Tratt., where the collection range is 12000-4000 $cm^{-1}$, the instrumental resolution is 4 $cm^{-1}$, and the number of scans is 32; removing the internal reference background, and collecting the spectrums at three different positions on the surface of each of the samples to obtain the average spectrum as the original spectrum;

(2) removing the interference peaks within the spectral bands of 12000-11800 $cm^{-1}$, 4200-4000 $cm^{-1}$, 7500-6500 $cm^{-1}$, and 5500-5000 $cm^{-1}$ in the original spectrum to obtain the peaks within the spectral bands of 11800-7500 $cm^{-1}$, 6500-5500 $cm^{-1}$, and 5000-4200 $cm^{-1}$, selecting the peaks within the spectral band of 5000-4200 $cm^{-1}$ as the model analysis peaks and pretreating the peaks within the spectral band of 5000-4200 $cm^{-1}$ by using the first derivative pre-treatment method;

(3) screening the characteristic wave number points within the range of 5000-4200 $cm^{-1}$ subjected to the 1st D pre-treatment by using the successive projections algorithm, and dividing the Gleditsiae Spina and the counterfeits thereof, the spine of *Gleditsia japonica* Miq., the spine of *Gleditsia microphylla* Gordon ex YT Lee and *Rubus cochinchinensis* Tratt., to be discriminated according to the characteristic wave number points by using the Kennard-Stone algorithm into the samples in the training set and the samples in the test set, wherein the samples in the training set comprise the 32 batches of samples, which are the 24 batches of Gleditsiae Spina, the 3 batches of spines of *Gleditsia japonica* Miq., the 2 batches of spines of *Gleditsia microphylla* Gordon ex YT Lee and the 3 batches of *Rubus cochinchinensis* Tratt., and the samples in the test set comprise the 11 batches of samples, which are the 8 batches of Gleditsiae Spina, the 1 batch of spines of *Gleditsia japonica* Miq., the 1 batch of spines of *Gleditsia microphylla* Gordon ex YT Lee and the 1 batch of *Rubus cochinchinensis* Tratt.;

(4) establishing the discriminant model based on the samples in the training set, extracting the total of five characteristic wave number points, $x_8$, $x_{13}$, $x_{16}$, $x_{19}$, and $x_{21}$, by using the step-by-step method, and applying the five characteristic wave number points to establish the following discriminant functions:

$$F_1 = 36387.907x_8 + 24242.533x_{13} + 9262.246x_{16} + 11456.025x_{19} + 13209.943x_{21} + 3.210, \text{ and}$$

$$F_2 = -43757.506x_8 + 40701.987x_{13} + 24623.897x_{16} + 28906.269x_{19} - 20234.651x_{21} + 4.496;$$

(5) substituting the total of five characteristic wave number points, $x_8$, $x_{13}$, $x_{16}$, $x_{19}$, and $x_{21}$, of the samples in the test set into the discriminant functions obtained in step (4) to discriminate the discriminant accuracies of the Gleditsiae Spina and the counterfeits thereof; and (6) performing the systematic cluster analysis by using the cluster analysis on the five characteristic wave number points extracted by using the step-by-step method in step (4) to validate discriminant accuracies of the obtained discriminant functions, and using the BP neural network model for validating the accuracies of the pattern recognition results of the characteristic wave number points obtained in step (3); wherein the cluster analysis adopts the method of the sum of squares of deviations, and the distance measure is the squared Euclidean distance; and the BP neural network model uses the characteristic wave number points extracted by using the successive projections algorithm as the inputs of the neural network, wherein the node in the input layer is the number of characteristic wave number points, the ten nodes exist in the hidden layer, and the four nodes exist in the output layer to establish the BP neural network model.

* * * * *